United States Patent
Westerman

(10) Patent No.: US 8,197,623 B1
(45) Date of Patent: Jun. 12, 2012

(54) THERMAL AND VACUUM ASSESSMENT METHOD

(75) Inventor: Everett A. Westerman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 154 days.

(21) Appl. No.: 12/690,389

(22) Filed: Jan. 20, 2010

Related U.S. Application Data

(60) Provisional application No. 61/205,799, filed on Jan. 23, 2009.

(51) Int. Cl.
*B32B 41/00* (2006.01)

(52) U.S. Cl. .............. 156/64; 156/94; 156/98; 264/257; 264/316; 264/36.1; 264/36.18; 264/36.22; 264/510; 73/40

(58) Field of Classification Search .................... 156/64, 156/94, 98; 264/257, 316, 36.1, 36.18, 36.22, 264/510; 73/40
See application file for complete search history.

(56) References Cited

U.S. PATENT DOCUMENTS

| 2002/0060018 A1* | 5/2002 | Lindsay et al. ............... 162/198 |
| 2008/0148817 A1* | 6/2008 | Miller et al. ....................... 73/40 |
| 2008/0308210 A1* | 12/2008 | Keller et al. ..................... 156/64 |

FOREIGN PATENT DOCUMENTS

JP 11207911 A * 8/1999

* cited by examiner

*Primary Examiner* — George Koch
(74) *Attorney, Agent, or Firm* — Yee & Associates, P.C.

(57) ABSTRACT

A thermal and vacuum assessment method includes providing a composite part having a repair area, installing a vacuum bag over the repair area, drawing a vacuum on the vacuum bag, testing for air leaks in the vacuum bag, heating the vacuum bag and obtaining a thermal image of the repair area.

20 Claims, 3 Drawing Sheets

THERMAL AND VACUUM ASSESSMENT METHOD

CROSS-REFERENCE TO RELATED APPLICATIONS

This application claims the benefit of and incorporates by reference in its entirety U.S. provisional application No. 61/205,799, filed Jan. 23, 2009 and entitled "THERMAL AND VACUUM ASSESSMENT METHOD".

TECHNICAL FIELD

The disclosure generally relates to methods for determining thermal variations and vacuum leak paths in a damaged structure. More particularly, the disclosure is generally directed to a time-efficient thermal and vacuum assessment method for determining the thermal variations and vacuum leak paths in a damaged structure prior to installing a bonded repair to ensure uniform heating and minimal porosity of the repair.

BACKGROUND

Currently, getting a damaged metallic or composite component ready for a bonded repair requires the technician to gain knowledge of the thermal characteristics of the repair area. Structural stiffeners, frames, thick doublers, and thin skins all accentuate the thermal variations during the cure process. Adhesive materials and composite material resin systems require heat to be cured. The resin chemistry requires the heated area to be within a very narrow temperature range for the resins to cure properly. The presence of heat sinks can cause the actual temperature variation to fall outside of the specified range. Any un-cured, undercured, or overcured resins will cause a failure in the repair. By understanding the thermal anomalies of the structure a cure plan can be developed that includes selection of the heating source and insulation methods needed to equalize the cure temperatures within the specified range prior to curing the part thus ensuring a well fully cured component.

As part of the thermal survey a vacuum leak check is often performed. Vacuum leaks around fasteners, between attached structures, and through holes in the structure can filter air and other gases through the adhesive/resin materials being cured thus creating porous bondlines and resins. By understanding and sealing the leak paths in the repair area, porosity will be minimized and the repair will pass any subsequent inspections.

Existing solutions for bonding a repair onto a structure includes a thermal survey and a vacuum leak test prior to the actual repair. To perform a survey the repair in reality needs to be performed two times. The first "repair" is the survey where a full-size doubler is constructed out of actual repair material using one of the templates created that identifies each ply boundary. A 60-ply repair can take hours cutting and orienting repair plies into a suitable doubler. This new doubler is then placed onto the prepared repair area using a separator ply (so the survey doubler does not bond to the structure). Numerous thermocouples are placed in the curable and adjacent areas to monitor temperatures during the cure. A vacuum bag and heat blanket stack-up is then prepared and placed over the doubler. The survey doubler is then cured using the actual equipment and process spelled out in the repair procedure. The thermocouples are monitored and insulation is added to low temperature regions of the repair and insulation is taken away from hotter sections of the repair. In some cases supplemental heat is applied to the backside of the repair or to the perimeter to act as a thermal dam thus reducing the cure temperature variation. In addition the thermal monitoring, vacuum gauges are monitored to ensure adequate vacuum is available to apply the required cure pressure to the repair. Low vacuum would indicate a vacuum leak and an opportunity for air or other gases to permeate the resin or bondline thus reducing the repair performance to the point of a failed repair. After the survey is complete and a cure plan is ready for the actual repair, the second set of repair materials can now be used to complete the actual repair.

Existing solutions double the time necessary to perform a bonded repair, require two complete sets of repair consumables including very expensive repair materials, and add another heat cycle to the parent structure. Parent composite structures are often limited to five heat cycles during the life of the structure before replacement is necessary due to heat degradation of the polymers in the composite material.

A time-efficient thermal and vacuum assessment method for determining the thermal variations and vacuum leak paths in a damaged structure prior to installing a bonded repair to ensure uniform heating and minimal porosity of the repair is needed.

SUMMARY

The disclosure is generally directed to a thermal and vacuum assessment method. An illustrative embodiment of the method includes providing a composite part having a repair area, installing a vacuum bag over the repair area, drawing a vacuum on the vacuum bag, testing for air leaks in the vacuum bag, heating the vacuum bag and obtaining a thermal image of the repair area.

In some embodiments, the thermal and vacuum assessment method may include providing a composite part having a repair area; installing a vacuum bag over the repair area; drawing a vacuum on the vacuum bag; testing for air leaks in the vacuum bag; heating the vacuum bag a first time; obtaining a first thermal image of the repair area; assessing a difference in temperature across the repair area based on the first thermal image; heating the vacuum bag at least a second time; obtaining at least a second thermal image of the repair area; and repairing the repair area.

In some embodiments, the thermal and vacuum assessment method may include providing a composite part having a repair area; installing a vacuum bag over the repair area; drawing a vacuum on the vacuum bag; testing for air leaks in the vacuum bag; detecting at least one leak in the vacuum bag; heating the vacuum bag a first time; obtaining a first thermal image of the repair area; assessing a difference in temperature across the repair area based on the first thermal image; sealing the at least one leak in the vacuum bag; heating the vacuum bag a least a second time; obtaining at least a second thermal image of the repair area; and repairing the repair area.

In some embodiments, the thermal and vacuum assessment method may include providing a composite part having a repair area; placing a separator film over the repair area; placing a repair doubler on the separator film; installing a vacuum bag over the repair area; drawing a vacuum on the vacuum bag; testing for air leaks in the vacuum bag; detecting at least one leak in the vacuum bag; heating the vacuum bag a first time; obtaining a first thermal image of the repair area; assessing a difference in temperature across the repair area based on the first thermal image; correlating cold indications on the first thermal image with locations on the repair area; sealing the at least one leak in the vacuum bag; heating the vacuum bag a second time; obtaining a second thermal image of the repair area; assessing a difference in temperature across the repair area based on the second thermal image; heating the vacuum bag a third time; obtaining a third thermal image of the repair area; assessing a difference in temperature across the repair area based on the third thermal image; determining that the repair area is outside an acceptable temperature range; preparing insulation; heating the vacuum bag a fourth time; installing the insulation on a backside of the vacuum bag; heating the vacuum bag at least a fifth time; obtaining at least a fourth thermal image of the repair area; assessing a difference in temperature across the repair area based on the fourth thermal image; performing a validation scan; preparing a thermal heating plan for final repair on the repair area; removing the vacuum bag from the repair area and cleaning the repair area; and repairing the repair area.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented The disclosure establishes a new methodology for performing a pre-repair vacuum and thermal survey using rapid heating and infrared cameras. The process may be performed using an actual repair doubler placed in a prepared repair area of a composite part, which may be vacuum-bagged without any insulation, heat blankets, and non-flyaway ply layers (peel plies, separator films, caul sheets, etc).

Figure 1:
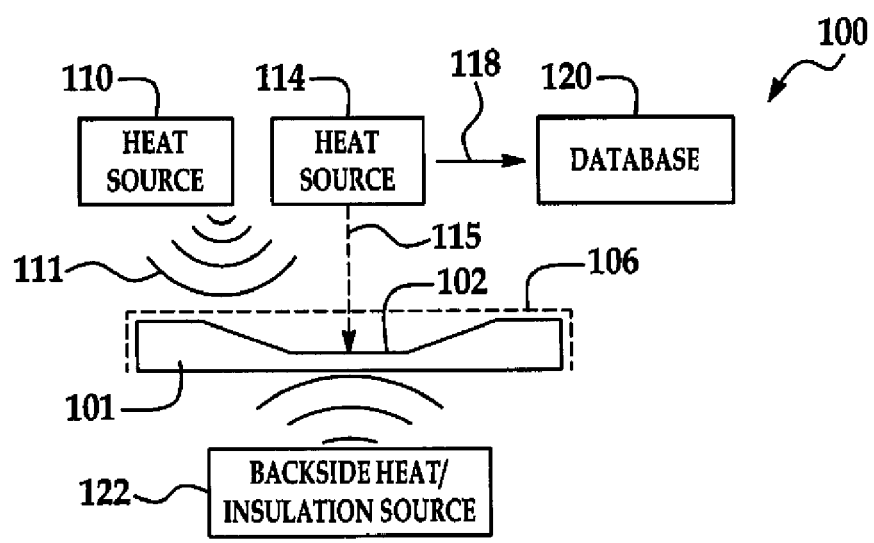
FIG. 1 is a block diagram of a system which is suitable for implementation of an illustrative embodiment of the thermal and vacuum assessment method, with a composite part to be repaired shown in cross-section.

Referring initially to FIG. 1, an exemplary system which is suitable for implementation of an illustrative embodiment of the thermal and vacuum assessment method, hereinafter method, is generally indicated by reference numeral 100. A composite part 101 on which the method may be performed includes a repair area 102. Prior to forming a bonded repair 103 (FIG. 3) in the repair area 102 of the composite part 101, the composite part 101 may be subjected to the method using the system 100. The system 100 may include a heat source 110 which emits heat 111 that heats the composite part 101. The heat source 110 may utilize any of numerous technologies including but not limited to induction, infrared, high-intensity flashed light or heat gun.

The system 100 may include an IR camera 114 which emits IR radiation 115 against the composite part 101 and takes thermal images of the composite part 101. A database 120 may be adapted to receive thermal images 118 from the IR camera 114. In some embodiments, the IR camera 114 may be a video camera. In other embodiments, the IR camera 114 may be a still-shot digital camera. The IR camera 114 may be any type of IR camera which has enough video or rapid single shot frames to record/display/sense thermal decay of the heated repair area 102 of the composite part 101. In some embodiments, the system 100 may include a backside heat/insulation source 122.

Figure 2:
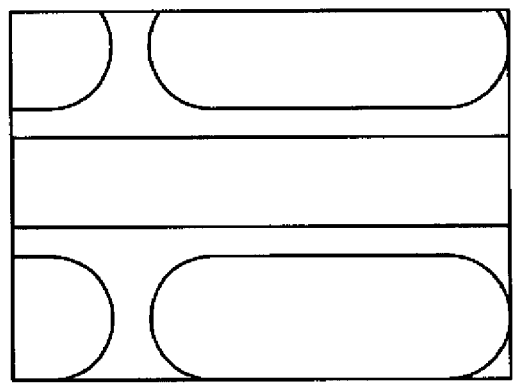
FIG. 2 is a thermal image of a repair area in a part and which indicates a need for supplemental backside heating to achieve uniform heating of the composite part prior to installing a bonded repair on the part.
Figure 3:
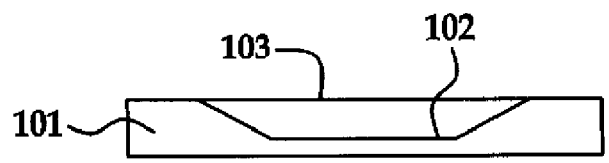
FIG. 3 is a cross-section of the part with the bonded repair in place.
Figure 4:
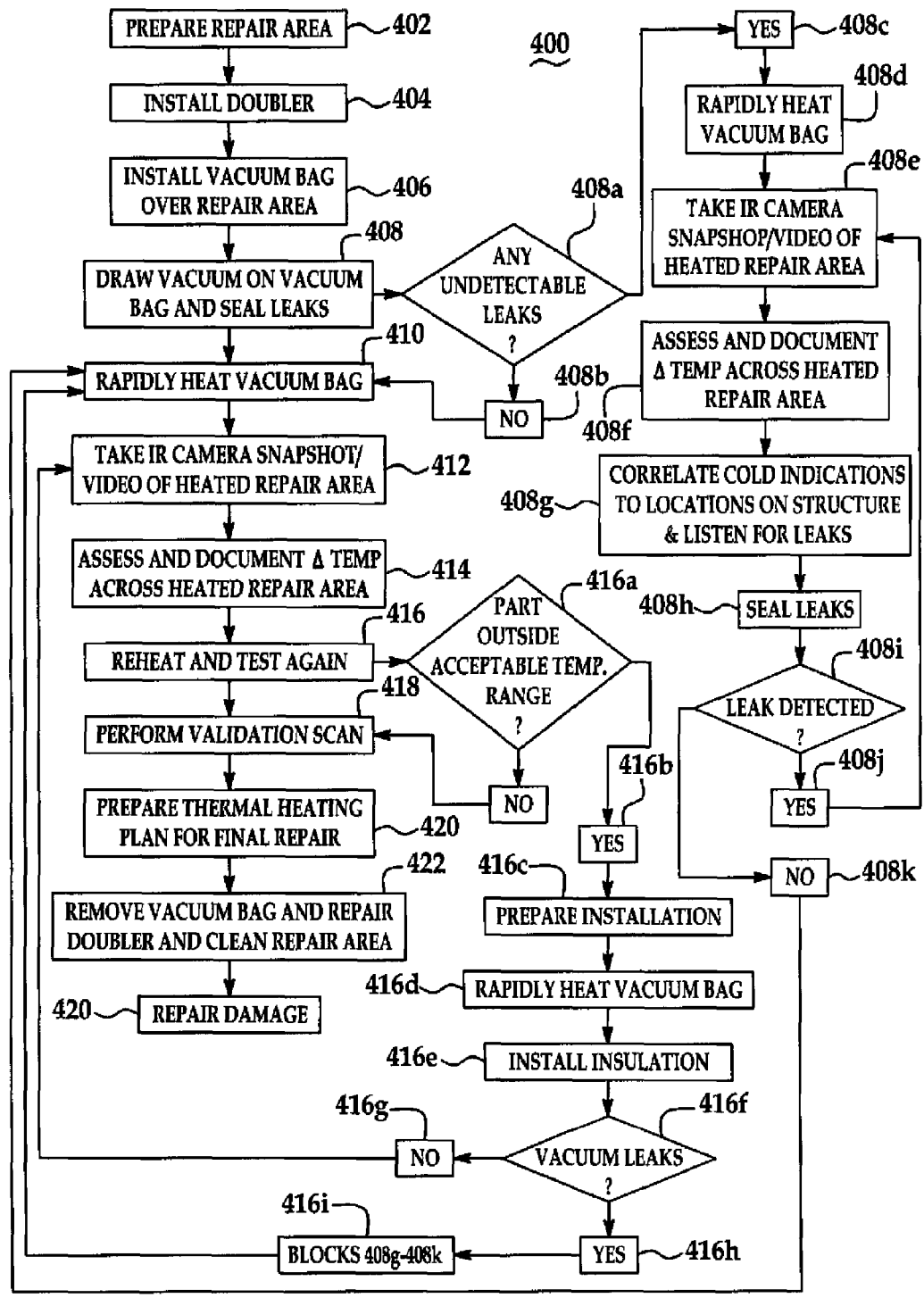
FIG. 4 is a block diagram of an illustrative embodiment of the thermal and vacuum assessment method.

Referring next to FIG. 4 in conjunction with FIGS. 1-3, a method 400 of an illustrative embodiment of the thermal and vacuum assessment method is shown. Fabrication of the repair doubler for the bonded repair 103 (FIG. 3) may start with preparation of the repair area 102 for repair. In block 402, the repair area 102 of the composite part 101 may be prepared for the bonded repair 103. Preparation of the repair area 102 may include taper sanding of the repair area 102 in preparation for a scarf repair or removing damage and sanding the repair area 102 to create a bondable surface. A template (not shown) may then be prepared to identify each ply of the bonded repair 103 as well as the size, geometry and ply orientation of the bonded repair 103. Using the template, each ply may be cut from a wet layup or prepreg material (not shown). The plies may be stacked and oriented onto each other to create the repair doubler for the bonded repair 103.

In block 404, a temporary separator film (not shown) may be prepared and laid onto the prepared repair area 102, after which the repair doubler may be installed onto the separator film. This may ensure that the ply paths of the repair doubler are aligned.

In block 406, a vacuum bag 106 may be installed over the entire repair area 102 without any extra materials between the repair doubler and the vacuum bag 106. In block 408, a vacuum may be drawn on the vacuum bag 106 and all obvious vacuum leaks may be sealed to ensure a vacuum pressure of at least 18-20 in. of mercury. In block 408a, a determination may be made as to whether there exist any undetectable leaks in the vacuum bag 106. If there are no undetectable leaks in the vacuum bag 106a in block 408b, the method may proceed to block 410. If there are undetectable vacuum leaks in the vacuum bag 106, the method may proceed through blocks 408c-408k, which will be hereinafter described.

If there are no undetectable vacuum leaks in the vacuum bag 106 in block 408b, then in block 410, the vacuum bag 106 may be rapidly heated to at least 20 degrees above ambient using the heat source 110. A sufficient quantity of heat 111 which is necessary to heat the repair doubler and composite part 101 may be used. In some applications, delta temperatures of two or more degrees may be sufficient since most IR cameras can detect delta temperatures of two or more degrees within the composite part 101 in a subsequent step. A 20-degree delta may provide enough dwell time for multiple scans and still not permit a chemical reaction needed to cure the repair doubler.

In block 412, an IR camera snapshot or video of the heated repair area 102 may be taken to obtain a thermal image 118 of the repair area 102. One to two seconds may be required to obtain a good thermal image 118 without being influenced by the thermal decay. Longer video times may increase the error factor and may lead to thermal anomaly decisions that don't support a good thermal survey. The thermal image 118 taken by the IR camera 114 may be stored in the database 120.

In block 414, the thermal image 118 which was taken from the IR snapshots or the video in block 412 may be used to assess the delta temperatures across the heated repair area 102. Any visual features on the composite part 101 may be used to help isolate or understand the thermal image 118. The high and low temperature zones in the repair area 102 may be documented. Block 414 may be performed by comparing the decay signatures with signatures from a database of similar signatures/structures or by reviewing and comparing the thermal deltas with the actual structural geometry. Anomalies ranging from vacuum leaks to heat sinks can be minimized by repairing the vacuum leaks and knowing where to place supplemental heat or insulation.

In block 416, using the documented thermal image anomalies from block 414, some supplemental heating or insulation may be applied to the backside of the repair area 102 using a backside heat/insulation source 122 to reheat the composite part 101. The composite part 101 may be tested again by repeating blocks 410, 412 and 414. In block 416a, a determination may be made as to whether the composite part 101 is outside the acceptable temperature range. If the composite part 101 is still outside the acceptable temperature range in block 416b, the process may proceed through blocks 416c-416i, as will be hereinafter described. This procedure may be performed after making the appropriate physical adjustment and retesting, thus achieving the expected result.

If the determination in block 416a reveals that the composite part 101 is not outside the acceptable temperature range in block 416j, a validation scan may be performed in block 418. Based on the final thermal image that shows thermal uniformity, a thermal heating plan for the final repair may be prepared in block 420. The thermal survey findings may be documented.

In block 422, the vacuum bag 106 may be removed from the composite part 101 and repair doubler may be removed from the repair area 102. The repair area 102 may be cleaned for the actual bonded repair. In block 424, the repair area 102 may be prepared for actual repair and the repair may be carried out following the approved repair process to form the bonded repair 103 in the repair area 102, as shown in FIG. 3.

As was described herein above, after a vacuum is drawn on the vacuum bag 106 and obvious leaks in the vacuum bag 106 are sealed in block 408a, a determination may be made as to whether there are any undetectable leaks in the vacuum bag 106 in block 408a. In block 408c, if undetectable leaks are found in the vacuum bag 106 then the vacuum bag 106 may be heated rapidly in block 408d. In block 408e, an IR camera snapshot or video of the heated repair area 102 may be taken. In block 408f, the delta temperature across the heated repair area 102 may be assessed and the resulting thermal image documented.

A vacuum leak may be present in the vacuum bag 106 if there are any cold spots on the thermal image that cannot be related to a heat sink. Therefore, in block 408g, the cold indications on the thermal image may be correlated to the actual locations on the composite part 101. An operator (not shown) may then listen (with or without supplemental listening devices) for air leaks in the vacuum bag 106. In block 408h, a sealant or putty may be used to seal any probable leak locations. In the event that additional leaks are detected in blocks 408i and 408j, blocks 408e-408h may be repeated as many times as are necessary to seal all leaks in the vacuum bag 106. In the event that no additional leaks are detected in block 408k, the process may continue to block 410. Block 408g may be performed by comparing the decay signatures with signatures from a database of similar signatures/structures or by reviewing and comparing the thermal deltas with the actual structural geometry of the composite part 101. Anomalies ranging from vacuum leaks to heat sinks can be minimized by repairing the vacuum leaks and knowing where to place supplemental heat or insulation.

As was described herein above, after the vacuum bag 106 is heated and the composite part 101 retested in block 416, a determination may be made as to whether the composite part 101 is outside the acceptable temperature range in block 416a. If the composite part 101 is found to be outside the acceptable temperature range in block 416b, as indicated in the thermal image shown in FIG. 2, insulation 122 in the size and shape which is needed to apply to the backside of the repair area 102 may be prepared in block 416c. With the insulation 122 ready to install, the vacuum bag 106 may be rapidly heated in block 416d. In block 416e, the newly cut insulation may be rapidly installed to the outside of the vacuum bag 106 using tape. If no vacuum leaks remain in the vacuum bag 106 in blocks 416f and 416g, the process may proceed to block 410. If there are still indications that vacuum leaks remain in the vacuum bag 106 (such as areas that are still cold and not adjacent to heat sinks) in blocks 416f and 416h, the process may proceed through blocks 408g-408k until all leaks are sealed, after which the process may proceed to block 410.

The existing thermal and vacuum assessment method solutions may require that two repair doublers be fabricated and cured. The thermal survey may be a dry run of the repair that includes an exact duplicate of every repair feature thus mimicking all cure details. The detection of vacuum leaks may be a hit or miss proposition in that there may be no direct correlation between low vacuum pressures and where the vacuum is actually leaking. TC spacing and TC placement may be very subjective; thus, the actual temperature distribution may be distorted. The second repair doubler may then be cured as the actual repair.

The method of the disclosure may require that only the actual repair doubler be fabricated. The actual thermal test may use very low heat and since the entire repair area may be exposed to the IR camera, thermal variations and vacuum leaks may show up as image anomalies. In addition, the IR cameras may use a very small pixel size and thus, minute temperature variations may be easily detected. Since the test may require less than a minute, changes in the supplemental heating, vacuum leak sealing, placement of insulation may be made rapidly.

Figure 5:
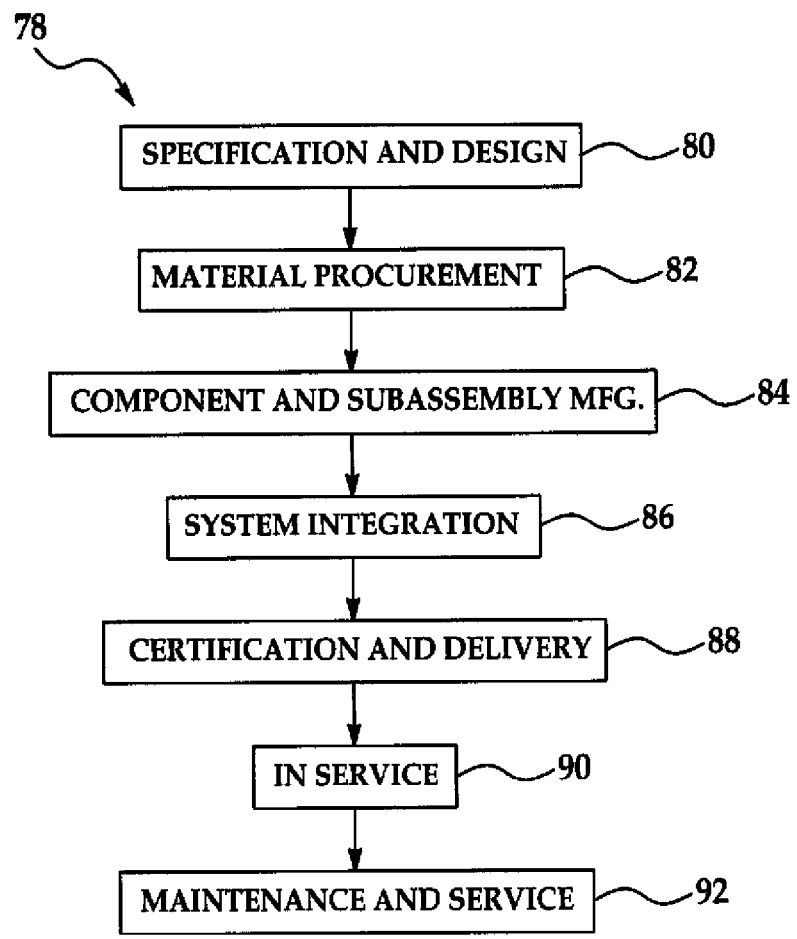
FIG. 5 is a flow diagram of an aircraft production and service methodology.
Figure 6:
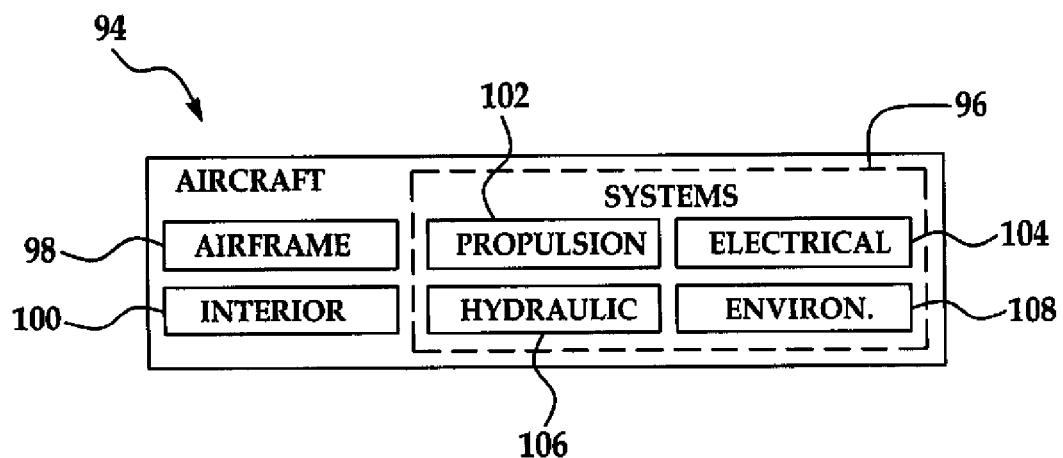
FIG. 6 is a block diagram of an aircraft.

Referring next to FIGS. 5 and 6, embodiments of the disclosure may be used in the context of an aircraft manufacturing and service method 78 as shown in FIG. 5 and an aircraft 94 as shown in FIG. 6. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A thermal and vacuum assessment method, comprising:
   providing a composite part having a repair area;
   installing a vacuum bag over said repair area;
   drawing a vacuum on said vacuum bag;
   testing for air leaks in said vacuum bag;
   heating said vacuum bag;
   obtaining a thermal image of said repair area; and
   assessing a difference in temperature across said repair area based on said thermal image.

2. The method of claim 1 wherein said testing for air leaks in said vacuum bag comprises testing for air leaks in said vacuum bag based on said thermal image.

3. The method of claim 2 wherein said testing for air leaks in said vacuum bag based on said thermal image comprises correlating cold indications on said thermal image with locations on said repair area.

4. The method of claim 1 further comprising installing a repair doubler in said repair area prior to said installing a vacuum bag over said repair area.

5. The method of claim 1 further comprising sealing air leaks in said vacuum bag.

6. The method of claim 1 further comprising performing a validation scan on said repair area.

7. The method of claim 6 further comprising repairing said repair area.

8. A thermal and vacuum assessment method, comprising:
   providing a composite part having a repair area;
   installing a vacuum bag over said repair area;
   drawing a vacuum on said vacuum bag;
   testing for air leaks in said vacuum bag;
   heating said vacuum bag a first time;
   obtaining a first thermal image of said repair area;
   assessing a difference in temperature across said repair area based on said first thermal image;
   heating said vacuum bag at least a second time;
   obtaining at least a second thermal image of said repair area; and
   repairing said repair area.

9. The method of claim 8 further comprising preparing insulation and applying said insulation to a backside of said vacuum bag after said heating said vacuum bag at least a second time.

10. The method of claim 8 wherein said testing for air leaks in said vacuum bag comprises testing for air leaks in said vacuum bag based on said first thermal image.

11. The method of claim 10 wherein said testing for air leaks in said vacuum bag based on said first thermal image comprises correlating cold indications on said first thermal image with locations on said repair area.

12. The method of claim 8 further comprising installing a repair doubler in said repair area prior to said installing a vacuum bag over said repair area.

13. The method of claim 8 further comprising sealing air leaks in said vacuum bag.

14. The method of claim 8 further comprising assessing a difference in temperature across said repair area based on said first thermal image.

15. The method of claim 8 further comprising performing a validation scan on said repair area prior to said repairing said repair area.

16. A thermal and vacuum assessment method, comprising:
   providing a composite part having a repair area;
   installing a vacuum bag over said repair area;
   drawing a vacuum on said vacuum bag;
   testing for air leaks in said vacuum bag;
   detecting at least one leak in said vacuum bag;
   heating said vacuum bag a first time;
   obtaining a first thermal image of said repair area;
   assessing a difference in temperature across said repair area based on said first thermal image;
   sealing said at least one leak in said vacuum bag;
   heating said vacuum bag a least a second time;
   obtaining at least a second thermal image of said repair area; and
   repairing said repair area.

17. The method of claim 16 wherein said testing for air leaks in said vacuum bag comprises testing for air leaks in said vacuum bag based on said first thermal image.

18. The method of claim 17 wherein said testing for air leaks in said vacuum bag based on said first thermal image comprises correlating cold indications on said thermal image with locations on said repair area.

19. The method of claim 16 further comprising preparing insulation and applying said insulation to a backside of said vacuum bag after said heating said vacuum bag at least a second time.

20. A thermal and vacuum assessment method, comprising:
   providing a composite part having a repair area;
   placing a separator film over said repair area;
   placing a repair doubler on said separator film;
   installing a vacuum bag over said repair area;
   drawing a vacuum on said vacuum bag;
   testing for air leaks in said vacuum bag;
   detecting at least one leak in said vacuum bag;
   heating said vacuum bag a first time;
   obtaining a first thermal image of said repair area;
   assessing a difference in temperature across said repair area based on said first thermal image;
   correlating cold indications on said first thermal image with locations on said repair area;
   sealing said at least one leak in said vacuum bag;
   heating said vacuum bag a second time;
   obtaining a second thermal image of said repair area;

assessing a difference in temperature across said repair area based on said second thermal image;
heating said vacuum bag a third time;
obtaining a third thermal image of said repair area;
assessing a difference in temperature across said repair area based on said third thermal image;
determining that said repair area is outside an acceptable temperature range;
preparing insulation;
heating said vacuum bag a fourth time;
installing said insulation on a backside of said vacuum bag;
heating said vacuum bag at least a fifth time;
obtaining at least a fourth thermal image of said repair area;
assessing a difference in temperature across said repair area based on said fourth thermal image;
performing a validation scan;
preparing a thermal heating plan for final repair on said repair area;
removing said vacuum bag from said repair area and cleaning said repair area; and
repairing said repair area.

* * * * *